May 31, 1927.

W. D. DAVIDSON

PIPE SLIP

Filed March 29, 1924      2 Sheets-Sheet 1

1,630,732

INVENTOR:
WILLIAM D. DAVIDSON,
BY
Graham + Lewis
ATTORNEYS.

May 31, 1927. 1,630,732

W. D. DAVIDSON

PIPE SLIP

Filed March 29, 1924   2 Sheets-Sheet 2

INVENTOR:
WILLIAM D. DAVIDSON,
BY
Graham + Hurin
ATTORNEYS.

Patented May 31, 1927.

1,630,732

UNITED STATES PATENT OFFICE.

WILLIAM D. DAVIDSON, OF LOS ANGELES, CALIFORNIA, ASSIGNOR, BY MESNE ASSIGNMENTS, OF ONE-HALF TO EMSCO DERRICK & EQUIPMENT COMPANY, OF LOS ANGELES, CALIFORNIA, A CORPORATION OF CALIFORNIA, AND ONE-HALF TO TITUSVILLE FORGE COMPANY, OF TITUSVILLE, PENNSYLVANIA, A CORPORATION OF MARYLAND.

PIPE SLIP.

Application filed March 29, 1924. Serial No. 702,804.

My invention relates to the arts of drilling and maintaining oil wells. In these arts it is necessary to place, remove, or suspend pipe in the well. It is often necessary, during operations on the well, to provide a temporary support for the pipe intermediate of the collars thereon. This can conveniently be accomplished by providing a supporting ring, having a conoidal hole therein somewhat larger than the pipe, which passes therethrough and which it is desired to support, the larger diameter of the conoidal hole being upward.

In this hole may be placed curved wedges, commonly called slips, the inner surface of these slips being cylindrical and provided with teeth to engage the pipe, and the outer surfaces being conoidal and of a shape to cooperate with the conoidal hole in the supporting ring to force the slips inwardly as the weight of the pipe is shifted thereto and the slips are pulled downwardly.

It is desirable that the collapsing action of the slips on the pipe be exerted uniformly about the periphery of the pipe, so that the pipe will not be forced permanently out of its true cylindrical form, and it is therefore desirable to make the slips in more than two segments. At the same time, since the slips must be quickly and simultaneously placed, even where there are only three men in the derrick, and since it is necessary, under ordinary conditions, to have each slip handled by a different man, it is necessary to keep the number of separate slips below four and preferably below three. It is not uncommon, however, to see three part slips in use, these slips requiring three men to place them in addition to the fourth man who controls the hoisting apparatus, from which the pipe is suspended.

It is an object of my invention to provide a four piece slip which can be placed by two men. Such a slip is more desirable than the common three piece slip, in that it requires one less man and provides a more uniform pressure. I am able to place four piece slips by two men, since I connect the slips in pairs, each pair having a common handle. I am aware that it has been proposed to connect four piece slips in pairs by pivoting a pivot pin for each pair. My invention differs from such previous attempts, in that I provide a pivot pin for each slip of each pair, connecting the pivot pins by common links. This allows a movement of each slip which seats it uniformly on the outer surface of the pipe.

Further objects and advantages will be made evident hereinafter.

Referring to the drawing which is for illustrative purposes only,

Figure 1:
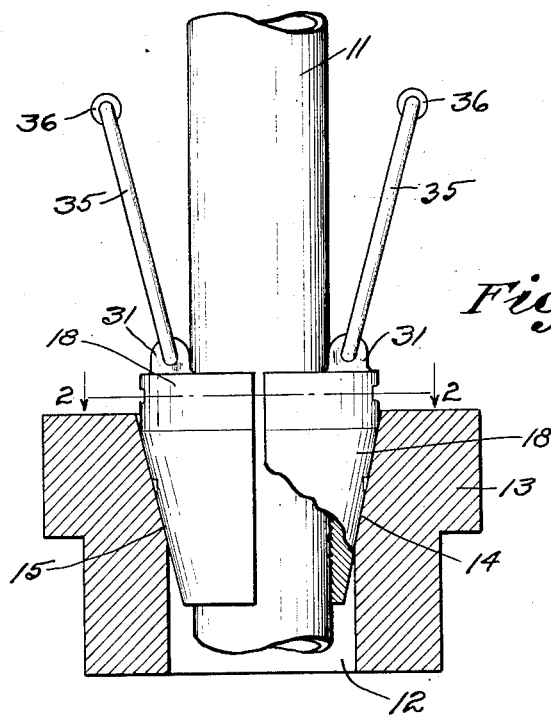
Fig. 1 is a side elevation partly in section showing the method of placing the slips to support the pipe.
Figure 4:
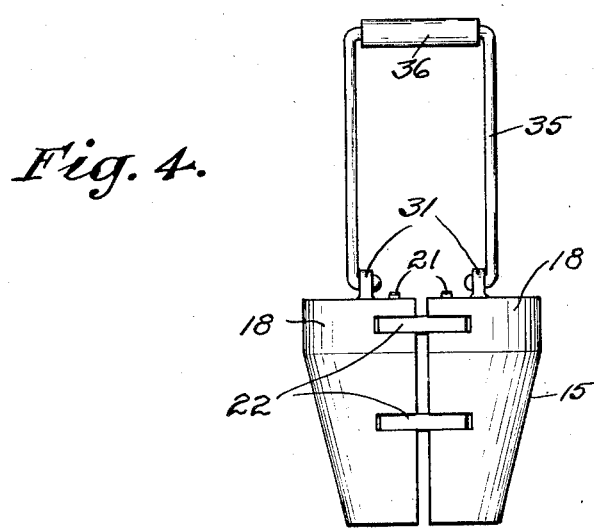
Fig. 4 is an elevation of the slips, showing handle arrangement.
Figure 2:
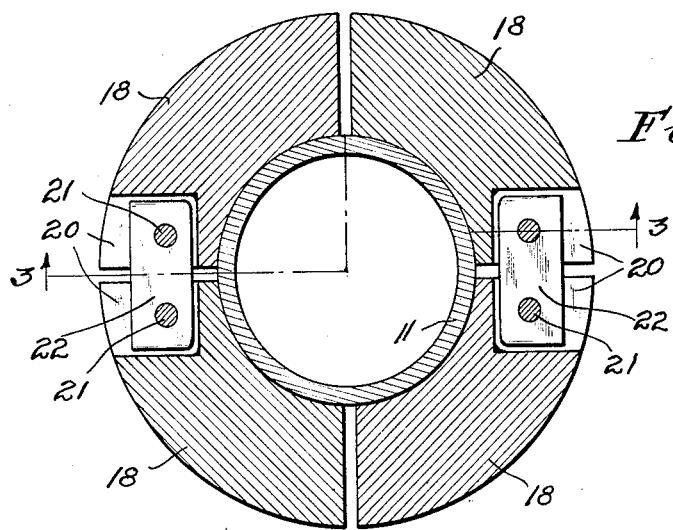
Fig. 2 is a section on an enlarged scale through one form of slips on a plane represented by the line 2—2 of Fig. 1.
Figure 3:
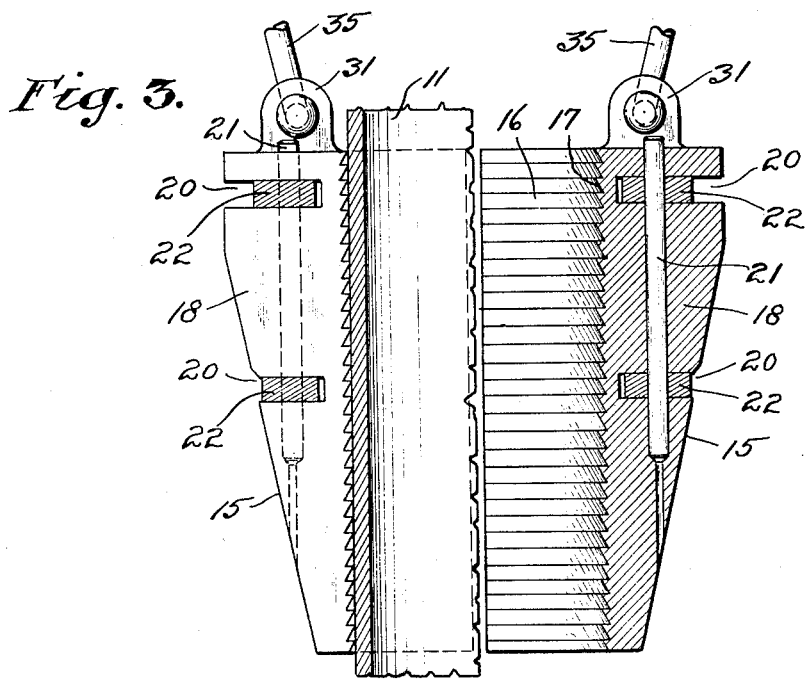
Fig. 3 is a section on a plane represented by the line 3—3 of Fig. 2.

In the form of the invention illustrated, 11 is the pipe which it is desired to support. This pipe passes through a hole 12 in a supporting ring 13. This ring may form a part of the rotary table or it may be part of an elevator supported independently of said table. The hole 12 is provided with a tapered upper portion 14 having a larger diameter at the top than at the bottom. Slips 18 are provided fitting in the tapered portion 14 of the hole 12, these slips having a tapered outer surface 15 and an inner cylindrical portion 16, which is preferably provided with teeth 17 to enable the slip to more tightly grip the pipe. The slips are preferably formed in four sections, as shown in Fig. 2, each section being provided with recesses 20 and with a vertically extending pivot pin 21. A link 22 is placed in each of the recesses 20, the pivot pins 21 passing through the links, thus allowing the slips 18 to readily turn about the pivot pins 21. The recesses 20, in which the links 22 fit, are only slightly larger than the links so that while there is some movement of the slips with relation to the links, the amount of this movement is limited. This is desirable for the purpose of preventing the slips from folding back on themselves and going out of operative position. Upwardly projecting ears 31 are provided on each of the slips 18 and a common handle 35 is provided, this handle having a roller 36 formed thereon. This allows each pair of slips to be handled as a unit so that only two men are required in addition to the man at the hoisting apparatus. One of these men stands on one side of the pipe and the other man stands on the other side, and at a signal from the operator of the hoisting apparatus, they place the slips 18 simultaneously in the holes 12. The operator then lowers the pipe 11. The teeth 17 engage the pipe and the weight of the pipe tends to force the slips downwardly and inwardly into contact with the surface of the pipe. By providing four slips, I am able to provide for a very uniform pressure around the periphery of the pipe and by providing the two pivot pins 21 and the links 22, I am able to allow for an individual adjustment of each slip to suit any irregularities in the pipe.

I claim as my invention:

1. In a gripping device of the character described: a pair of slips having pairs of recesses extending inwardly from their outer sides, the recesses of each slip being spaced from each other and from the upper and lower ends of the slip, each pair of recesses being adapted to receive a link crosswise; said links lying on the bottoms of said pairs of recesses; a vertical pin in each of said slips, said pins extending through said links to hingedly connect said slips; and common means independent of said pins for holding said slips, said pins being quickly removable.

2. A casing slip of the character described, comprising a plurality of sectors having upper and lower recesses in their opposing lateral faces, upright pivot rods carried by said sectors and intersecting said recesses, and links disposed between adjoining sectors and having their ends engaging the companion recesses and pivot rods thereof.

In testimony whereof, I have hereunto set my hand at Los Angeles, California, this 21st day of March, 1924.

WILLIAM D. DAVIDSON.